United States Patent [19]

Lee

[11] Patent Number: 5,116,183
[45] Date of Patent: May 26, 1992

[54] APPARATUS FOR UNLOADING FREIGHT FROM AN OPEN FREIGHT CAR

[76] Inventor: Sang H. Lee, 165-1 Daehyun-Dong, Buk-Ku, Daegu, D.P.R. of Korea

[21] Appl. No.: 614,511

[22] Filed: Nov. 16, 1990

[30] Foreign Application Priority Data

Nov. 27, 1989 [KP] D.P.R. of Korea ............... 89-17735

[51] Int. Cl.⁵ ............................................. B65G 67/26
[52] U.S. Cl. ........................... 414/395; 414/394; 414/378; 414/695.5; 15/56
[58] Field of Search ............... 414/376, 377, 378, 389, 414/390, 391, 392, 393, 394, 339, 340, 344, 349, 373, 569, 585, 519, 520, 525.1, 570, 695.5, 509-518, 679, 395; 15/56

[56] References Cited

U.S. PATENT DOCUMENTS

| | | | |
|---|---|---|---|
| 616,263 | 12/1898 | Shepherd | 414/395 |
| 1,037,861 | 9/1912 | Butler | 414/394 |
| 1,138,627 | 5/1915 | Considine | 414/378 |
| 1,804,287 | 5/1931 | Spry | 414/394 X |
| 2,291,539 | 7/1942 | Faber et al. | 414/379 |
| 2,419,129 | 4/1947 | Fitzgerald | 414/379 |
| 2,649,189 | 8/1953 | Schmidt | 414/395 X |
| 2,801,014 | 7/1957 | Colson | 414/394 X |
| 3,329,289 | 7/1967 | Fritz | 414/394 |

FOREIGN PATENT DOCUMENTS

| | | | |
|---|---|---|---|
| 777078 | 2/1935 | France | 414/395 |
| 663649 | 5/1979 | U.S.S.R. | 414/390 |
| 779227 | 11/1980 | U.S.S.R. | 414/390 |
| 911532 | 11/1962 | United Kingdom | 414/392 |

*Primary Examiner*—Frank E. Werner

[57] ABSTRACT

An unloading apparatus comprises a supporting frame, a railroad disposed on the bottom of the supporting frame for an open freight car with freight, a pair of belting members hung on the upper portion of the supporting frame, and a moving member including pivotal rods with a shoveling member, whereby when the moving member moves forward and backward along the pair of belting members, the freight are automatically unloaded through a plurality of outlets of the open freight car.

19 Claims, 11 Drawing Sheets

APPARATUS FOR UNLOADING FREIGHT FROM AN OPEN FREIGHT CAR

BACKGROUND OF THE INVENTION

1. Field of the Invention

The present invention relates to an apparatus for unloading freight from an open freight car and more particularly, to an apparatus for unloading freight such as limestone, coal, and the like loaded in the open freight car so as to deliver the freight to a designated place.

2. Description of the Prior Art

Generally, when workers unload freight such as limestone or coal loaded in an open freight car, there are a number of problems such as dust pollution, labor expenses, and the like. In order to avoid such problems, when fork lift cranes apply to unload the freight from the open freight car, there are also disadvantages such as dust pollution and handling expenses.

SUMMARY OF THE INVENTION

Accordingly, it is an object of the present invention to provide an apparatus for unloading freight loaded in an open freight car so as to overcome such problems.

Another object of the present invention is to provide an apparatus which includes a supporting frame, a railroad disposed on the bottom of the supporting frame for an open freight car containing freight such as limestone or coal, a pair of chain belts or a pair of wire ropes suspended on the upper portion of the supporting frame, and a moving member including pivotal rods with a shovel or a fork, whereby when the moving member moves forward and backward along the pair of chain belts or the pair of wire ropes, the freight are automatically unloaded through a plurality of outlets of the open freight car for delivering the freight to a designated place.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an unloading apparatus which comprises a supporting frame, a railroad disposed on the bottom of the supporting frame for an open freight car with freight, a pair of belting members hung on the upper portion of the supporting frame, and a moving member including pivotal rods with a shoveling member, whereby when the moving member moves forward and backward along the pair of belting members, the freight are automatically unloaded through a plurality of outlets of the open freight car.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
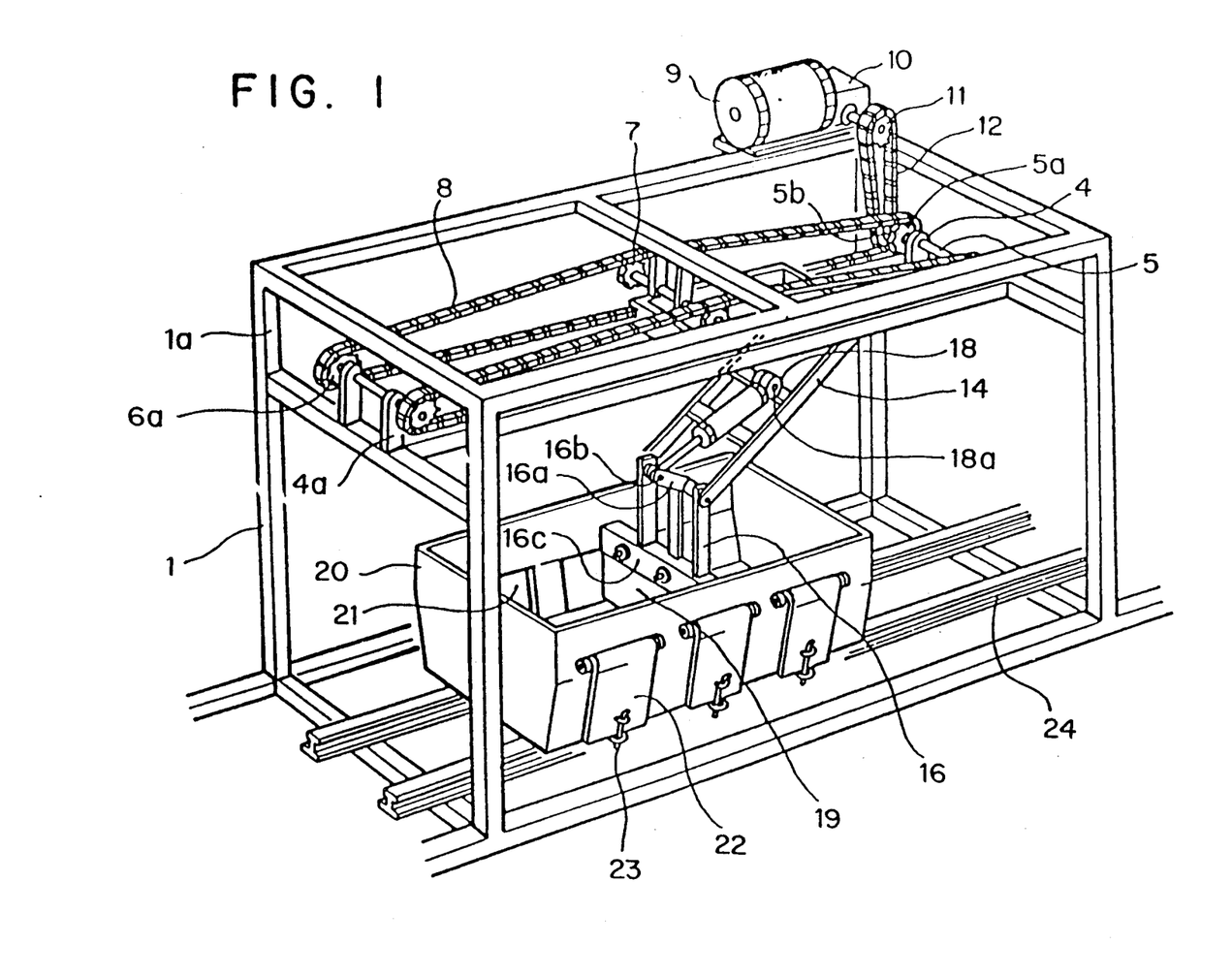
FIG. 1 is a perspective view of the apparatus according to the present invention.
Figure 2:
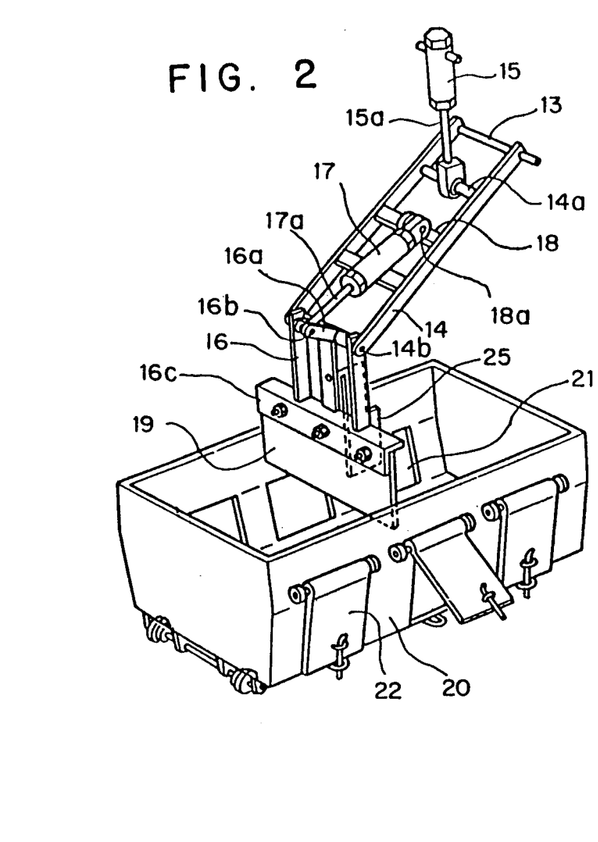
FIG. 2 is a perspective view of a moving member combined with an open freight car according to the present invention.
Figure 3:
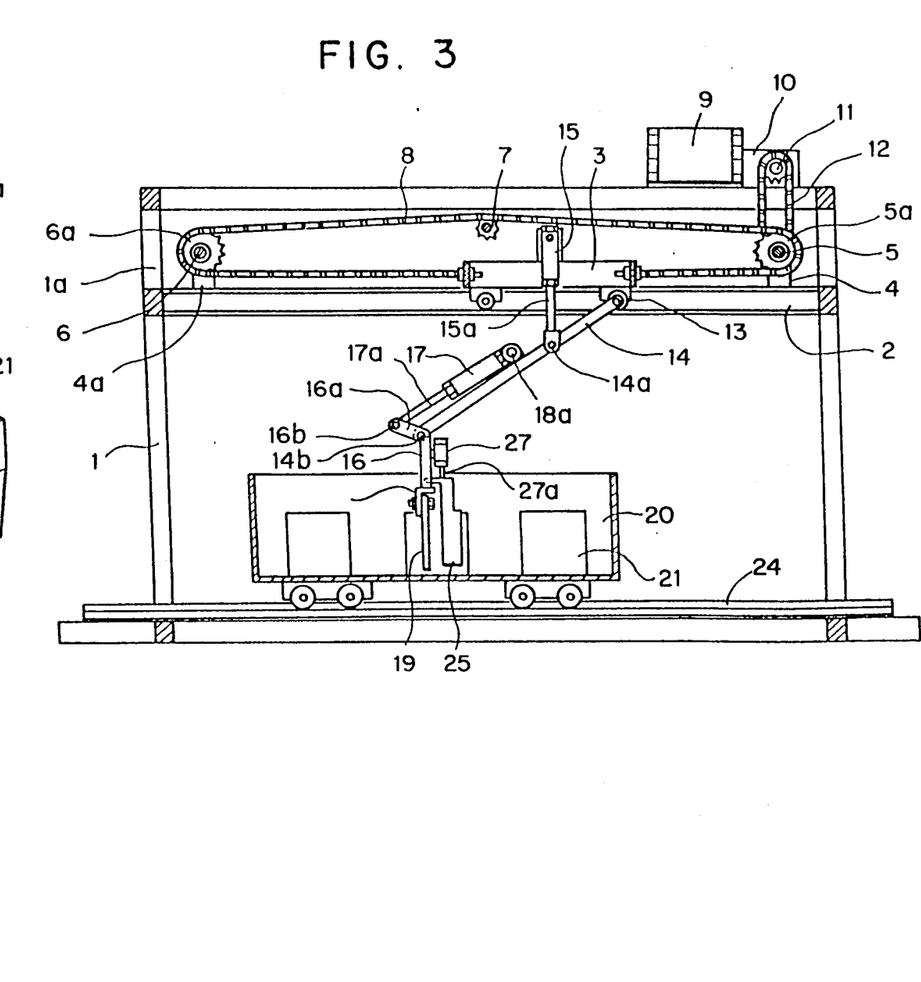
FIG. 3 is a sectional view of the apparatus according to the present invention.
Figure 4:
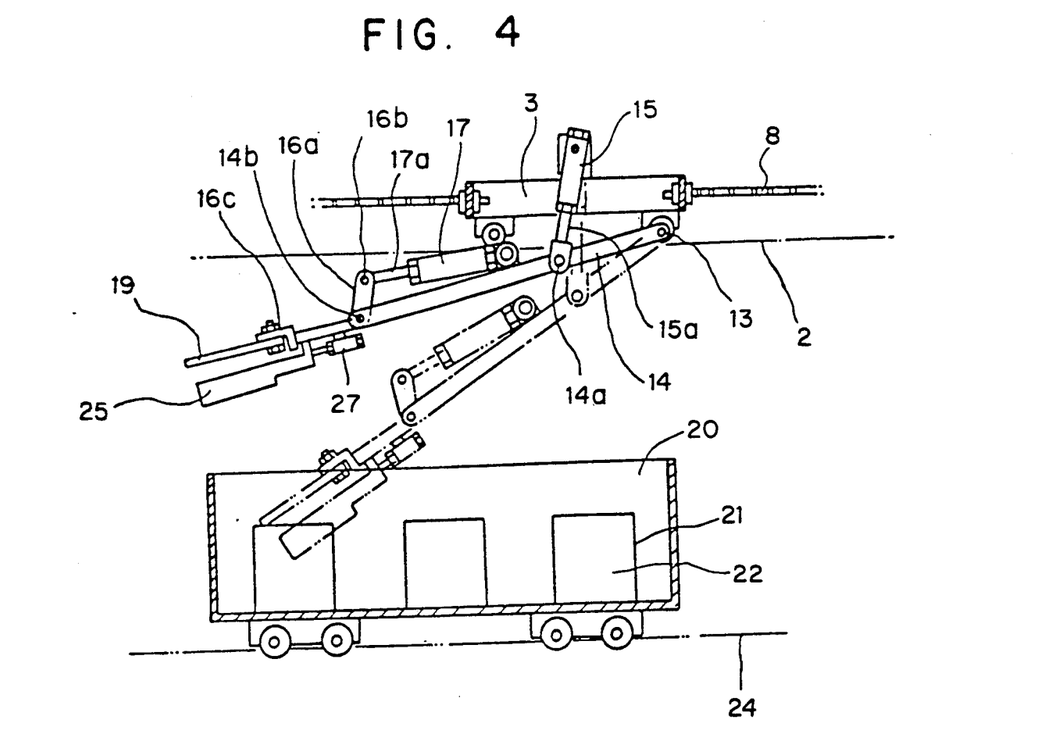
FIG. 4 is a front elevational view of the moving member according to the present invention showing its operation.
Figure 5:
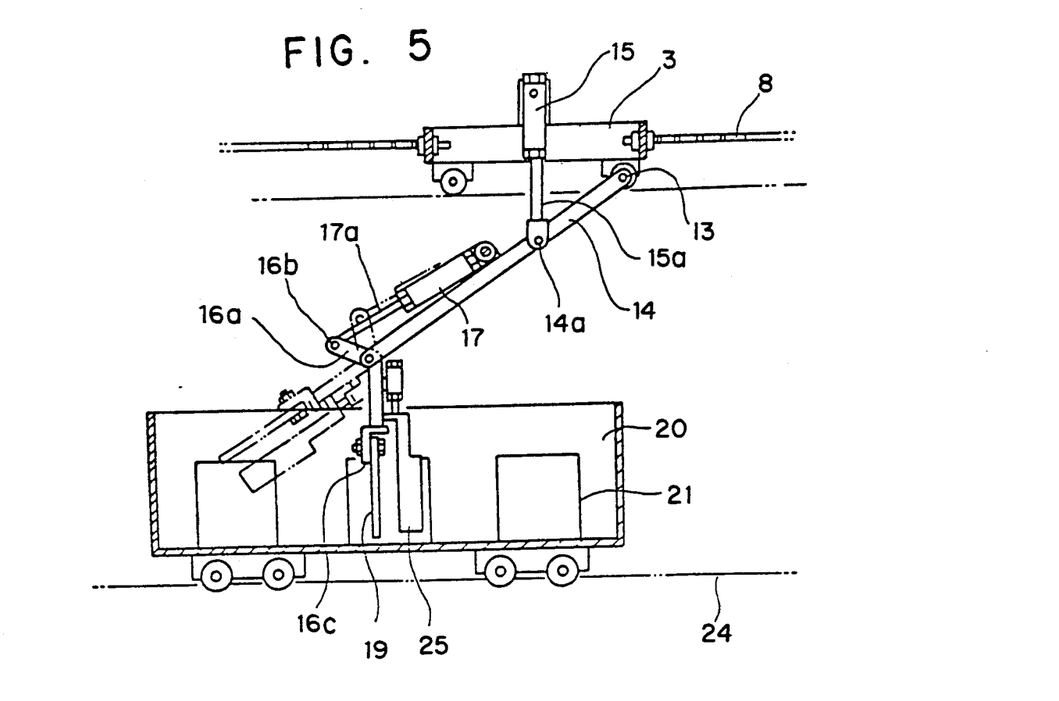
FIG. 5 is a front elevational view of the moving member according to the present invention showing its shoveling operation.

Referring now in detail to the drawings for the purpose of illustrating preferred embodiments of the present invention, the apparatus for unloading freight from an open freight car as shown in FIGS. 1, 2, and 3, comprises a supporting frame 1, a railroad 24 disposed on the bottom of the supporting frame 1 for the open freight car 20 to come into the supporting frame 1, a pair of belting members such as chain belts 8 supported on a pair of horizontal supports 2 which are disposed on the upper portion 2a of the supporting frame 1, a moving member 3 inserted into the pair of belting members for moving forward and backward along the belting members, a pair of pivotal rods 14 pivotably connected to the moving member 3 and pivotal supports 16, a shoveling member such as a shovel 19, and a main motor 9 for rotating the belting members.

The supporting frame 1 has an opened hexahedral configuration. The open freight car 20 contains a plurality of outlets 21 having a door 22 with a locking pin, respectively. The pair of belting members such as chain belts 8 are provided with a main front gear 5a and a back gear 6a about shafts 5 and 6 supported by gear supports 4 and 4a, respectively. Also, the belting members such as chain belts 8 are rotated by gears 5a and 6a and they are easily rotated by a guiding gear 7, respectively. The gear supports 4 and 4a are supported on the horizontal supports 2, respectively (FIG. 3). The main front gear 5a has a co-axial auxiliary front gear 5b for being in gearing relationship with a driving gear 11 through a chain 12. The driving gear 11 is connected a reducing device 10 of the main motor 9 mounted to the top portion of the supporting frame 1 (FIG. 1).

As shown in FIGS. 2, 3, 4, and 5, the pair of pivotal rods 14 are pivotably connected to the moving member 3 through a shaft 13 fixed to one ends thereof, respectively. A first oil pressure cylinder 15 mounted to the moving member 3 is fixed to a first connecting rod 14a through a first piston 15a. A second oil pressure cylinder 17 is pivotably connected to a second connecting rod 18 through a pivotal pin 18a. A second piston 17a of the second cylinder 17 is pivotably connected to a driving pin 16a through a pivotal pin 16b, which is pivotably connected to a connecting pin 14b fixed to the other ends of the pair of pivotal rods 14 (FIG. 2). The pivotal supports 16 are provided with an attachment 16c for fixing to the shovel 19 through a plurality of bolts and nuts.

Figure 6:
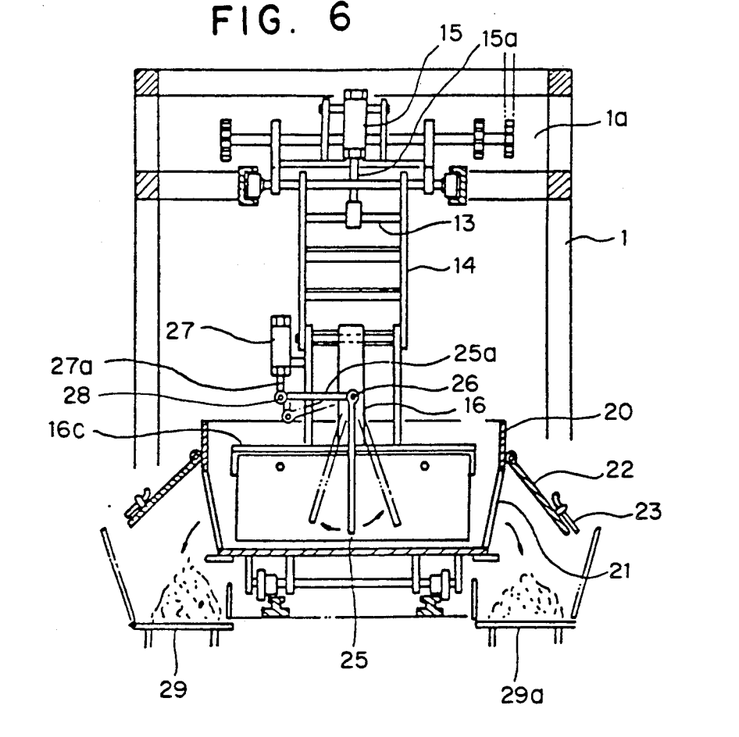
FIG. 6 is a side elevational view of the moving member according to the present invention for showing its unloading operation.
Figure 7:
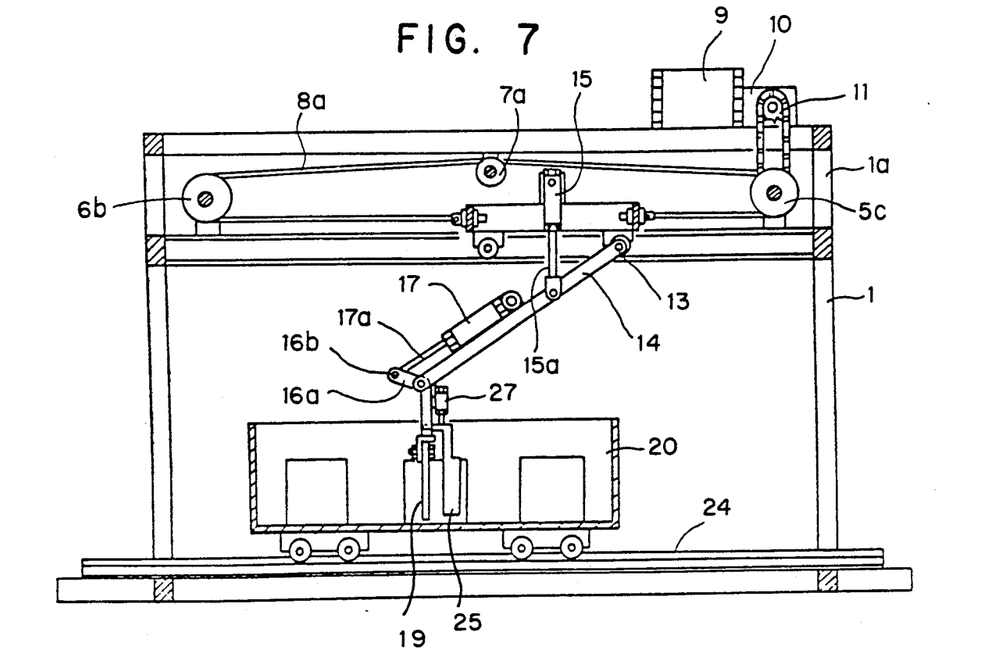
FIG. 7 is a front elevational view of a second embodiment of the belting member of the apparatus according to the present invention.

As shown in FIGS. 6 and 7, an assistant shoveling member 25 is located at right angle to the shoveling member 19 for the shoveling member 19 to easily insert into the freight in the open freight car since a third oil pressure cylinder 27 contains a third piston 27a having a connecting rod 25a which is connected at right angle to the assistant shoveling member 25 through pivot pins 26 and 28. Thereafter, when the shoveling member such as the shovel 19 is moved forward and backward, the freight can completely moved out from the outlets 21. At this time, the freight is transferred to a pair of conveyors 29 and 29a to be delivered to the designated place (FIG. 6).

Figure 8:
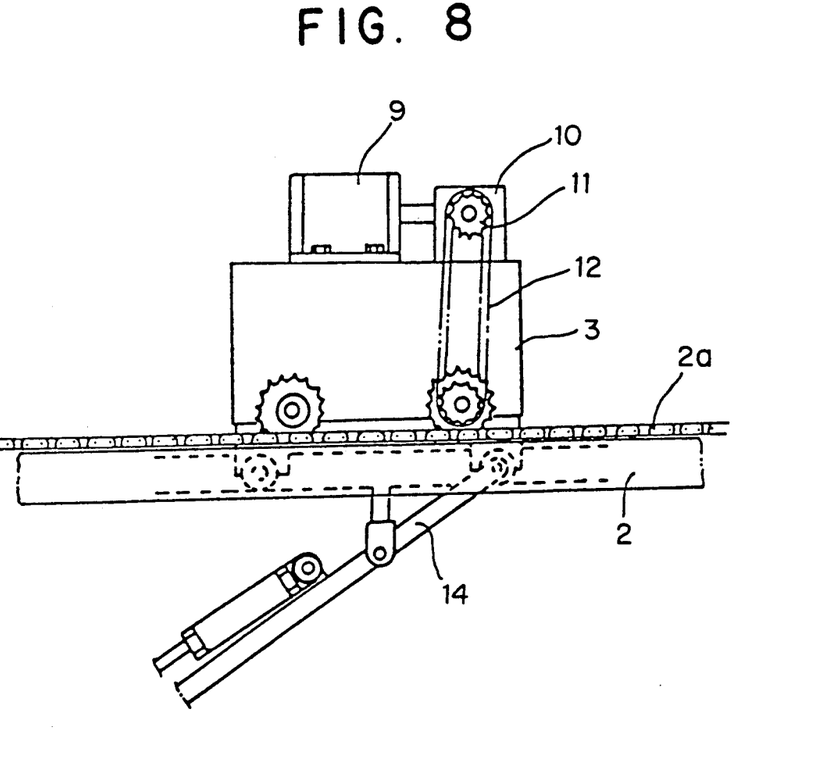
FIG. 8 is a front elevational view of a second embodiment of the moving member of the apparatus according to the present invention.
Figure 9:
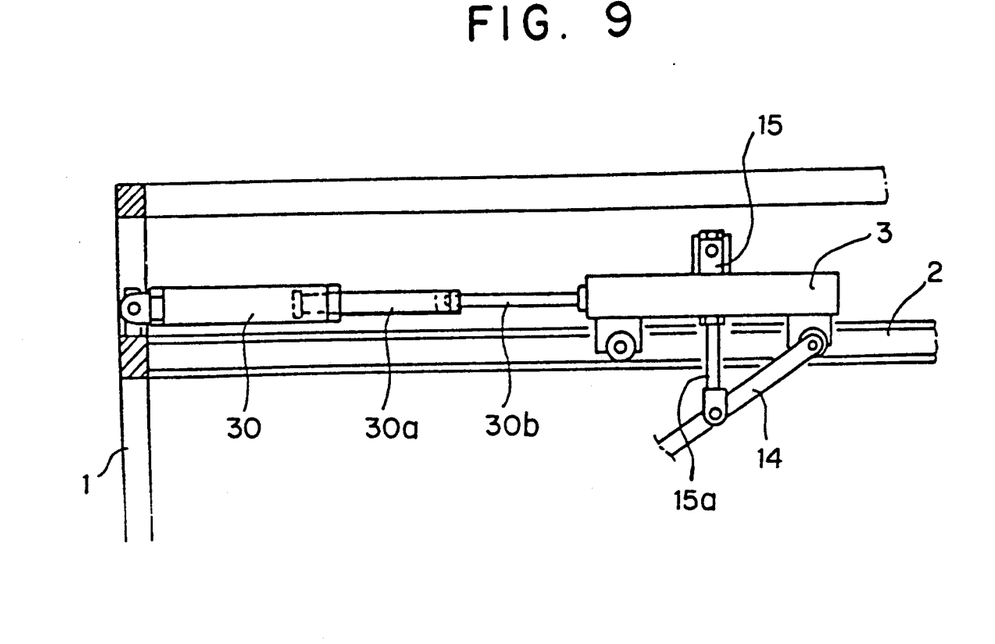
FIG. 9 is a front elevationl view of a third embodiment of the moving member of the apparatus according to the present invention.

As shown in FIG. 8, the moving member 3 is provided with the main motor 9 disposed on the top thereof. Also, as shown in FIG. 9, the moving member 3 is provided with a main oil pressure cylinder 30 mounted to the upper portion of the supporting frame 1. The main oil pressure cylinder 30 contains a main piston 30a connected to the moving member 3 through a main connecting rod 30b, whereby the moving member can be moved forward and backward by operation of the oil pressure cylinder.

Figure 10:
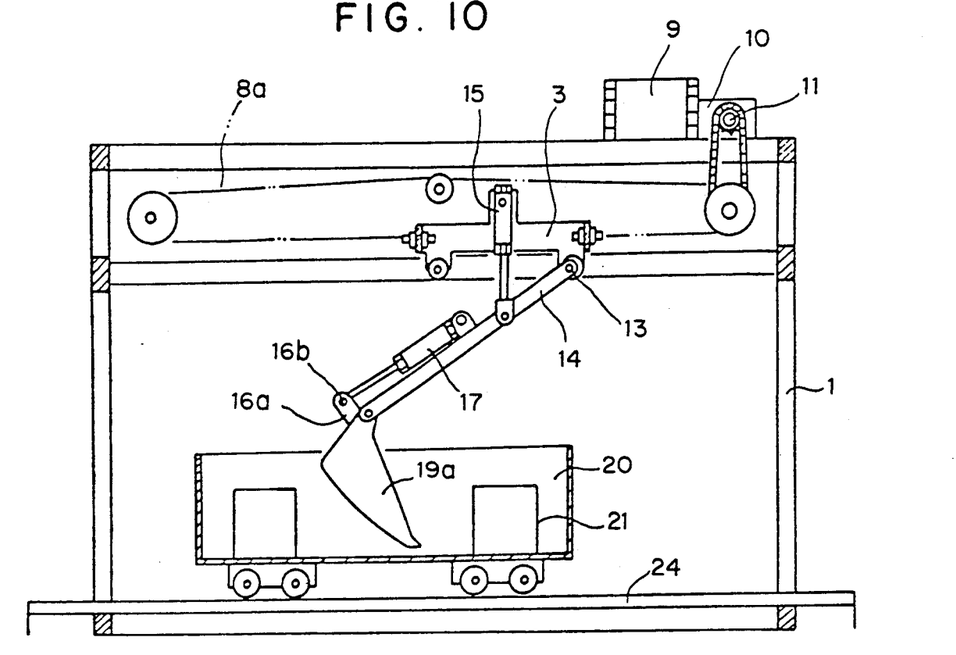
FIG. 10 is a front elevational view of a second embodiment of shoveling member of the apparatus according to the present invention.

As shown in FIGS. 7, 9, and 10, a pair of wire ropes 8a as the belting members can be replaced for the chain belts 8. At this time, the rollers 5c, 6b, and 7a can be used as replacements for the gears 5a, 6a, and 7. Also, as shown in FIG. 10, a fork 19a can be replaced for the shovel 19. At this time, the assistant shoveling member 25 is not necessary.

Figure 11:
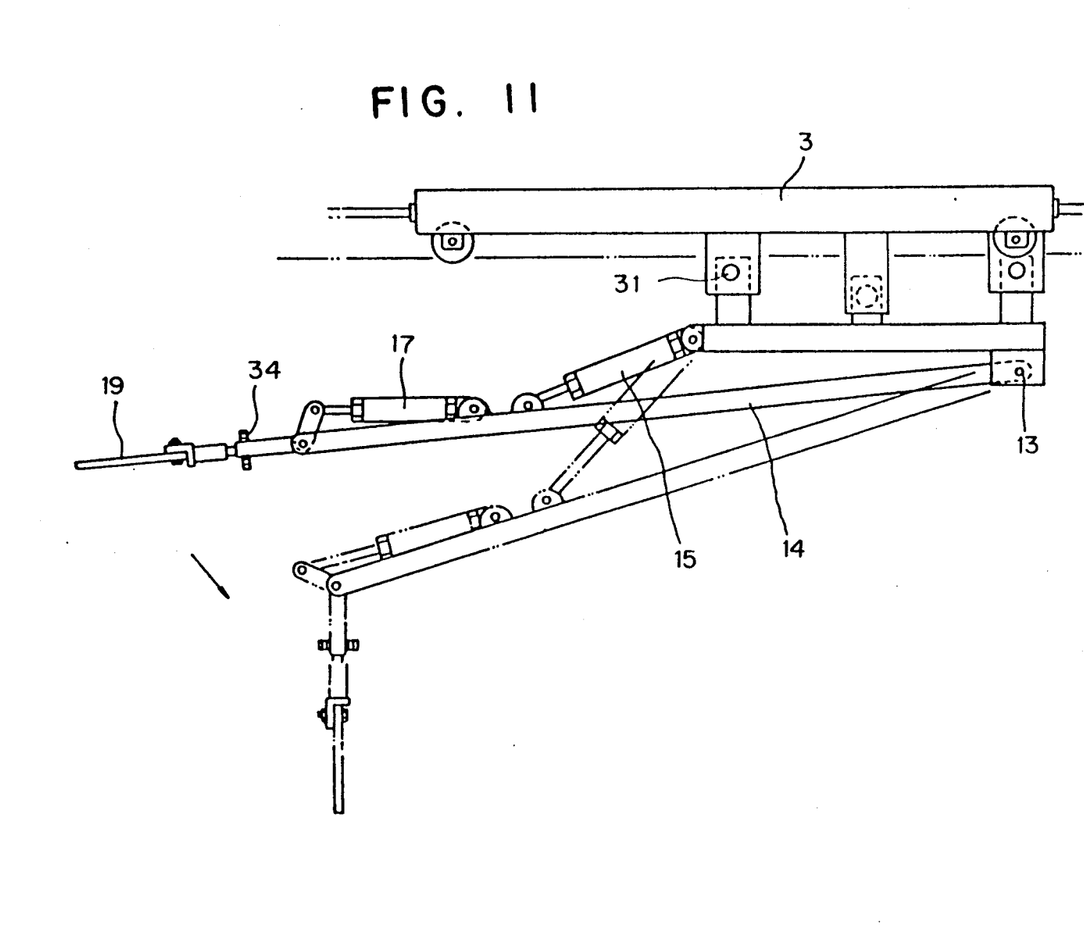
FIG. 11 is a front elevational view of a third embodiment of shoveling member of the apparatus according to the present invention.
Figure 12:
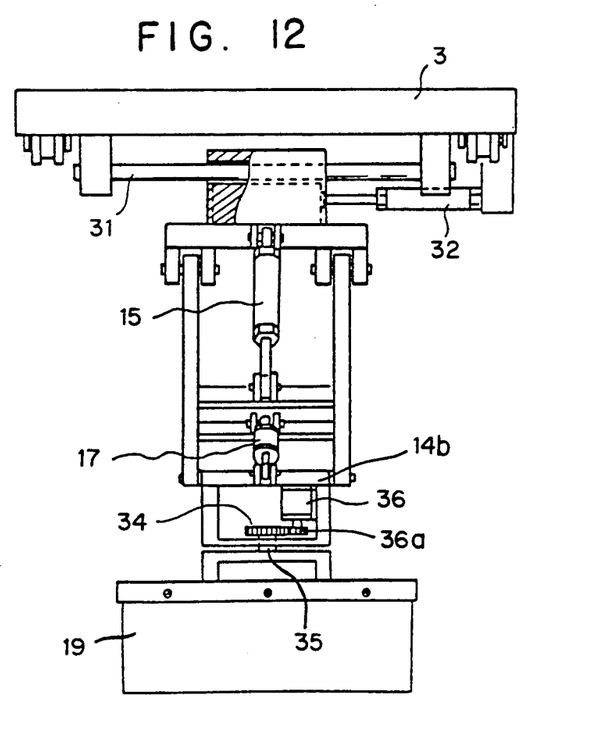
FIG. 12 is a side elevational view of the third embodiment of shoveling member of the apparatus according to the present invention.
Figure 13:
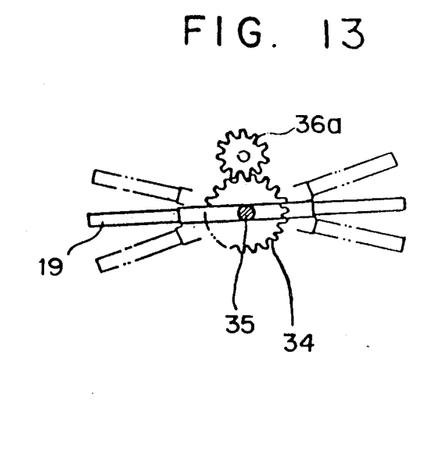
FIG. 13 is an enlarged front elevational view of a connecting portion of the shovel of FIG. 12.
Figure 14:
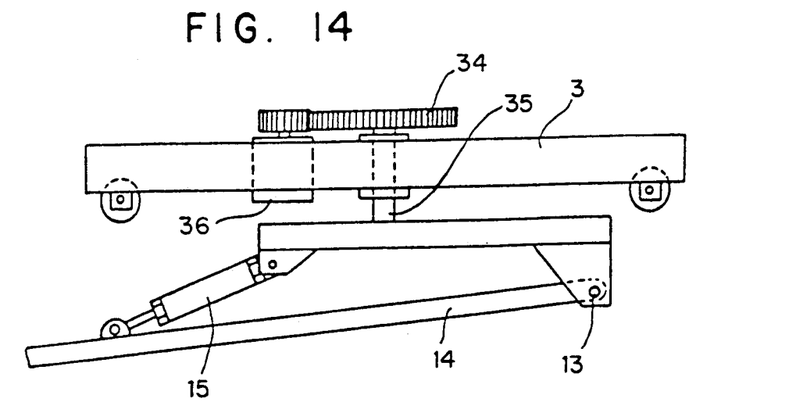
FIGS. 14 and 15 are front elevational views of the moving member of the apparatus according to the present invention showing its rotating operation.
Figure 15:
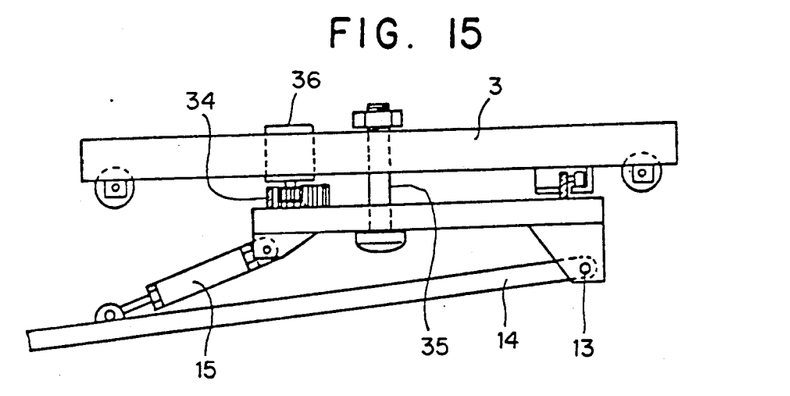

As shown in FIGS. 11, 12, and 13, the moving members 3 are provided with a shaft 31 for moving the shoveling member 19 or 19a along the shaft 31 through a fourth oil pressure cylinder 32 and an attachment 33. Also, the shoveling member 19 or 19a is connected to a gear shaft 35 of a first gear 34 which is in gearing relationship with a second gear 36a actuated by a small motor 36 (FIG. 13). Therefore, when the small motor 36 rotates, the pivotal rods 14 having the shoveling member 19 or 19a rotates for completely cleaning up the freight in the open freight car 20 (FIGS. 14 and 15).

Figure 16:
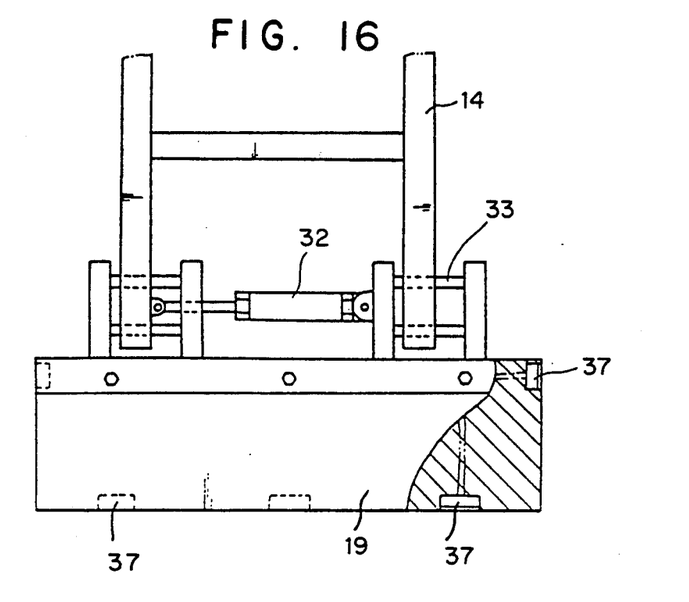
FIG. 16 is a front elevational view of the shovel containing cut away portions in order to illustrate a sensor attached to the shovel according to the present invention.
Figure 17:
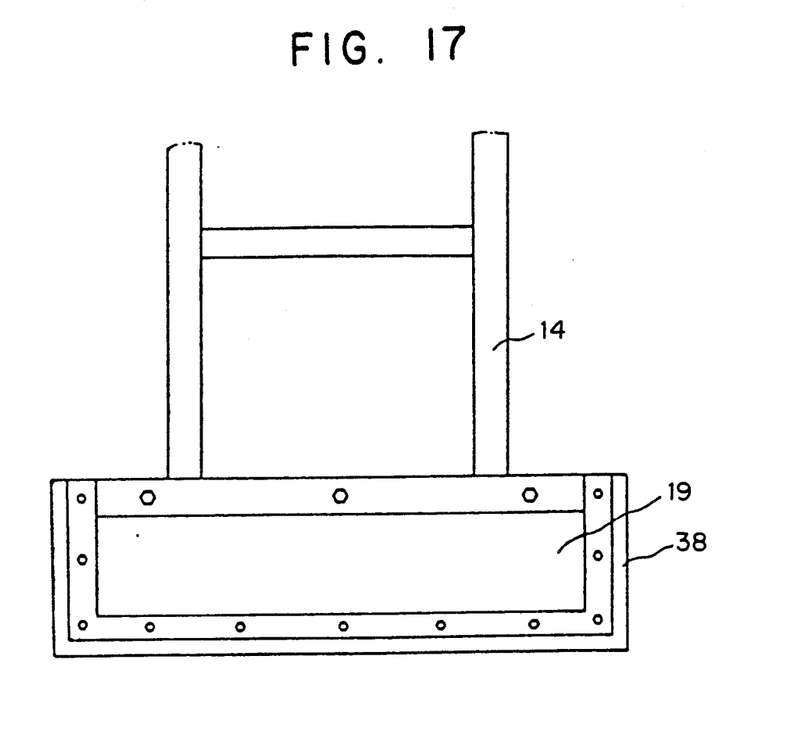
FIG. 17 is a front elevational view of the shovel with a cushion plate according to the present invention.

As shown in FIG. 16, the shoveling member 19 or 19a includes a plurality of sensors 37 disposed at an end edge portion and both side portions thereof. Also, the shoveling member 19 or 19a can moved to right and right sides by operation of the fourth cylinder 32 through a plurality of shafts 33 passed through the pivotal rods 14. The shoveling member 19 or 19a can include a cushion plate 38 attached thereto (FIG. 17).

Figure 18:
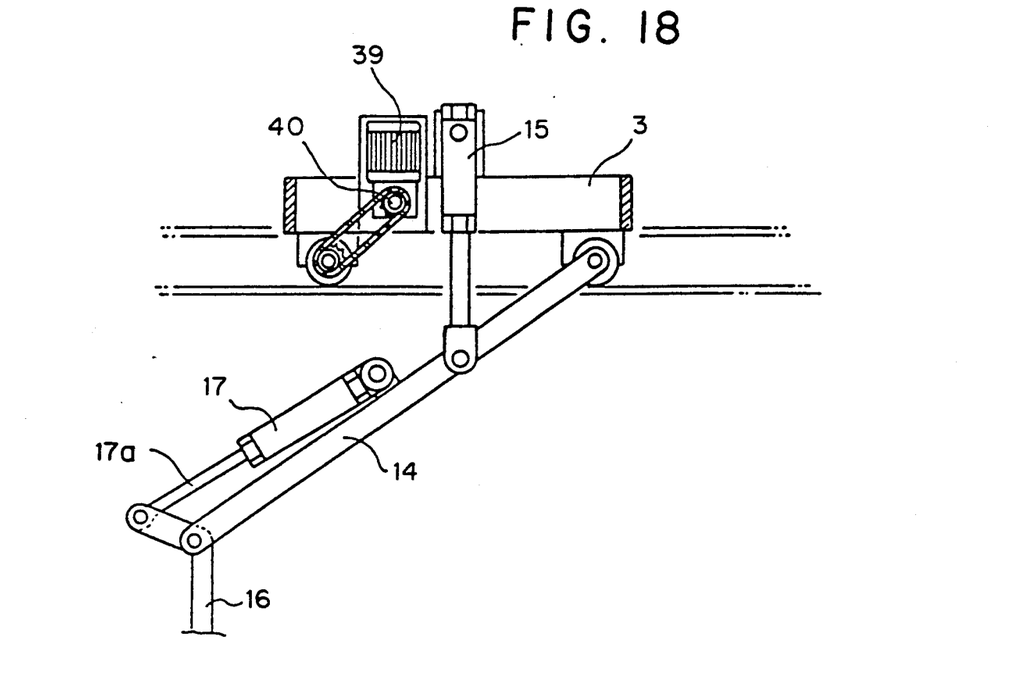
FIG. 18 is a front elevational view of the moving member with a self-propeller according to the present invention.

As shown in FIG. 18, a two-way motor 39 mounted to the moving member 3 rotates a fourth gear 40 to make rotate a self-propeller for making to move the moving member 3 forward and backward, respectively.

Figure 19:
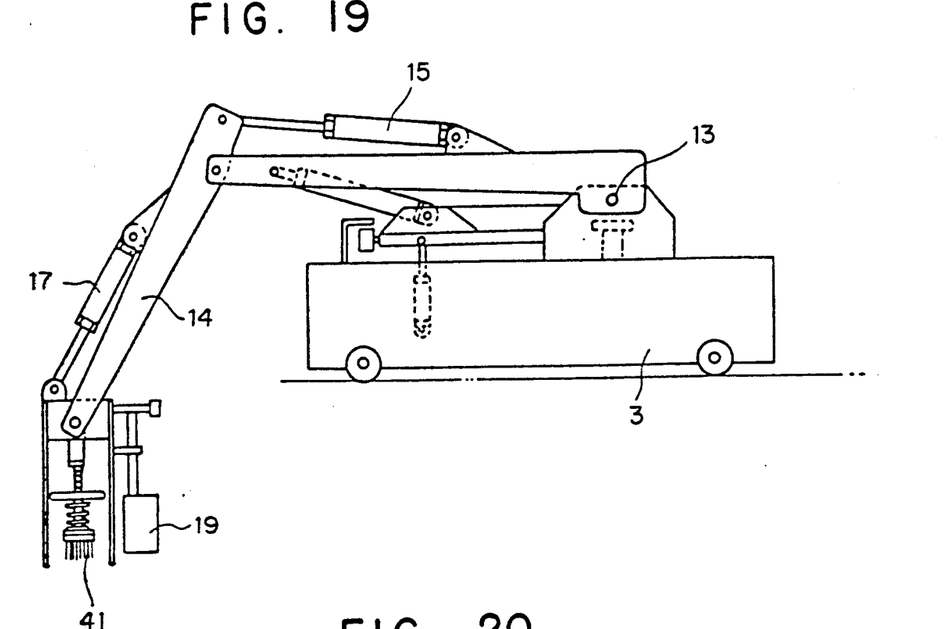
FIGS. 19 and 20 are front elevational views of the moving member having a brush according to the present invention.
Figure 20:
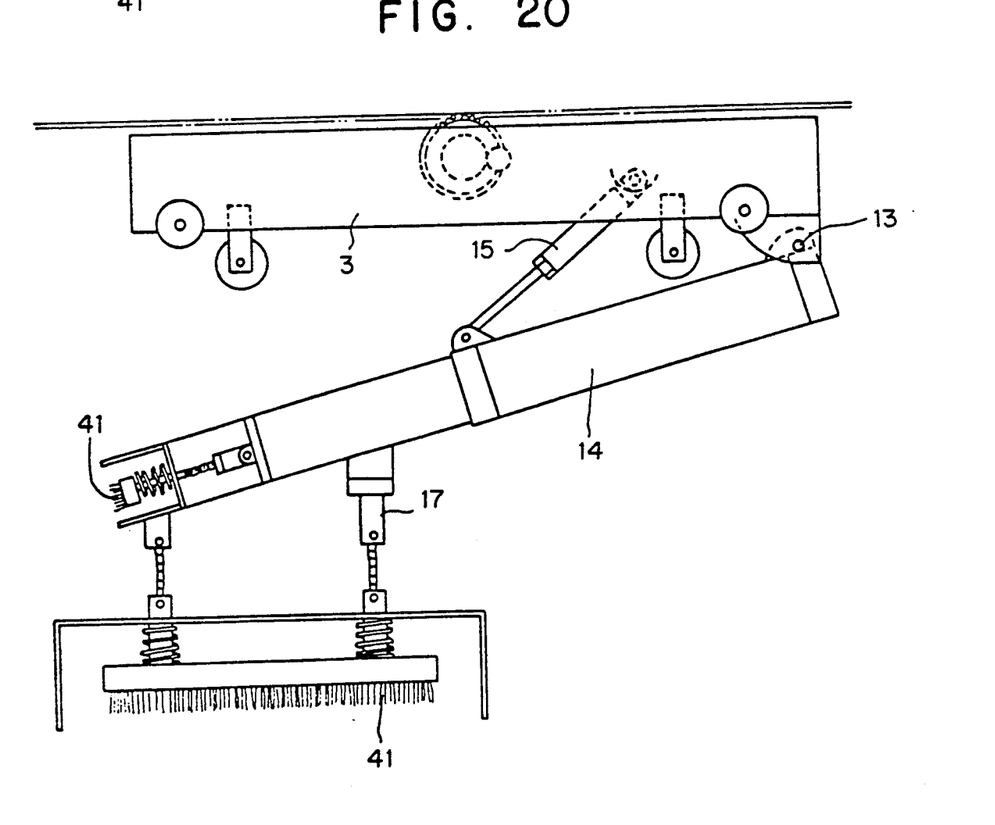
Figures 21, 22, 23:
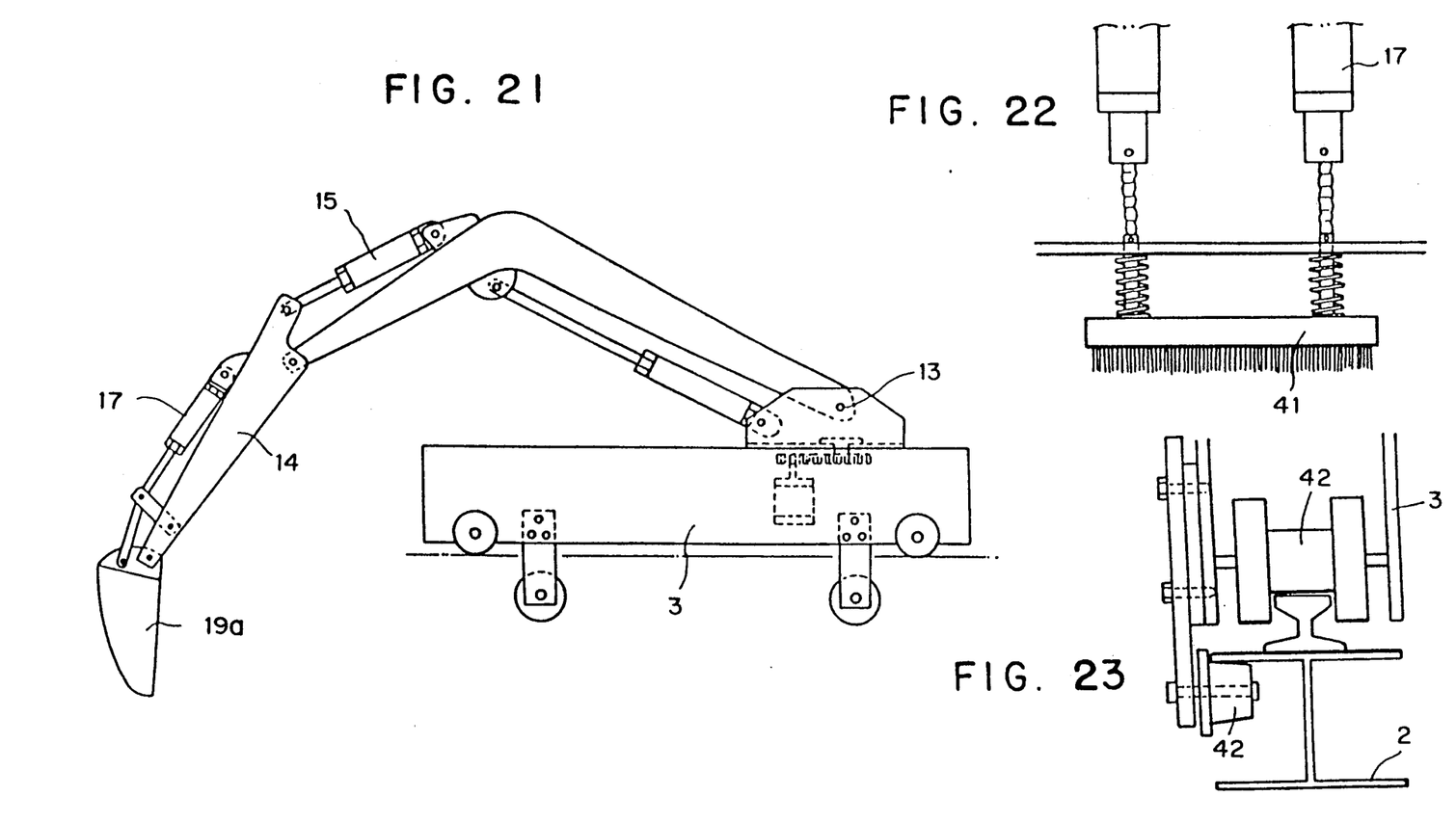
FIG. 21 is a front elevational view of a third embodiment of shoveling member of the apparatus according to the present invention.
FIG. 22 is an enlarged front elevational view of the brush according to the present invention.
FIG. 23 is a front elevational view of the movable unloading member with rolling members according to the present invention.

As shown in FIGS. 19, 20, and 22, the pivotal rods 14 and the second cylinder 17 can include at least one brush 41 for wiping around the open freight car, respectively.

As shown in FIG. 23, the horizontal supports 2 can contain a H-shaped configuration. Therefore, the moving member 3 is provided with a plurality of rollers 42 for rotatably mating with the H-shaped horizontal supports 2.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for unloading freight loaded in an open freight car, which comprises:
   a hexahedral supporting frame,
   a pair of railroad rails disposed on the bottom of said supporting frame providing means for positioning an open freight car having a plurality of outlets on sides thereof in the supporting frame,
   a pair of belting members supported on a pair of horizontal supports which are disposed on an upper portion of said supporting frame, respectively,
   a moving member inserted into said pair of belting members for moving forward and backward along said pair of belting members;
   a connecting member pivotally connected to said moving member by pivotal mounting means,
   a shoveling member pivotally connected to said connecting member by pivotal mounting means, and
   a main motor for rotating said belting member, whereby when the belting member is rotated by the motor, the moving member is moved forward and backward so that the shoveling member is moved forward and backward within the open freight car in the supporting frame so as to provide means for moving out the freight through the plurality of outlets in the freight car sides.

2. The apparatus of claim 1, wherein the pair of belting members are chain belts.

3. The apparatus of claim 2, wherein the chain belt is provided with a front gear, a back gear, and a guiding gear for effectively rotating therethrough, said front gear being provided with a motor gear connected to a motor shaft of a main motor.

4. The apparatus of claim 1, wherein the pair of belting members are wire ropes.

5. The apparatus of claim 4, wherein the wire ropes are provided with a front roller, a back roller, and a guiding roller for effectively rotating therethrough, said front roller being provided with a motor roller connected to a motor shaft of a main motor.

6. The apparatus of claim 1, wherein the moving member includes a plurality of rollers for effectively moving on a pair of horizontal supports disposed on the upper portion of the supporting frame.

7. The apparatus of claim 6, wherein the horizontal supports have a H-shaped configuration.

8. The apparatus of claim 6, wherein the moving member is moved forward and backward by operation of a main oil pressure cylinder mounted to said supporting frame.

9. The apparatus of claim 6, wherein the moving member is provided with a small motor disposed on the top thereof for self propelling on the pair of horizontal supports.

10. The apparatus of claim 6, wherein the moving member is provided with a shaft mounted thereto for receiving an elongated aperture of an raised portion of the shoveling member and moving forward and backward by operation of a main oil pressure cylinder.

11. The apparatus of claim 1, wherein the supporting frame is provided with a pair of conveyors disposed under an outside of said railroad rails of the supporting frame for delivering the separated freight from the open freight car to a designated place.

12. The apparatus of claim wherein the moving member includes a pair of pivotal rods connected to said moving member and said shoveling member at its both ends, a first oil pressure cylinder connected to said moving member and said pair of pivotal rods through a first pivot pin, and a second oil pressure cylinder pivotably connected to said pair of pivotal rods and said shoveling member through a second pivotal pin.

13. The apparatus of claim 1, wherein the shoveling member is a shovel.

14. The apparatus of claim 13, wherein the shovel is provided with an assistant shovel located at a right angle to said shovel for the shovel to insert into the freight in the open freight car.

15. The apparatus of claim 13, wherein the shovel is provided with a third gear for being in gearing relationship with a fourth gear of the connecting member through a small motor so that the shovel can rotate within the open freight car.

16. The apparatus of claim 13, wherein the shoveling member is provided with a plurality of sensors for detecting the open freight car.

17. The apparatus of claim 13, wherein the shovel includes a cushion plate attached thereto.

18. The apparatus of claim 13, wherein the shoveling member is provided with a plurality of brushes connected to the connecting member and the second oil pressure cylinder for wiping an interior of the open freight car after moving out the freight.

19. The apparatus of claim 1, wherein the shoveling member is a fork.

* * * * *

UNITED STATES PATENT AND TRADEMARK OFFICE
CERTIFICATE OF CORRECTION

PATENT NO. : 5,116,183
DATED : May 26, 1992
INVENTOR(S) : Lee

It is certified that error appears in the above-identified patent and that said Letters Patent is hereby corrected as shown below:

On the title page, item: [76] Inventor:" change

"Buk-Ku, Daegu, D.P.R. of Korea" to

--Buk-Ku, Daegu, Republic of Korea--

Signed and Sealed this

Twenty-eighth Day of September, 1993

Attest:

BRUCE LEHMAN

*Attesting Officer*   *Commissioner of Patents and Trademarks*